United States Patent [19]
Holloway

[11] 3,937,111
[45] Feb. 10, 1976

[54] ADJUSTABLE LIVE CENTER ADAPTER

[76] Inventor: Raymond L. Holloway, 15624 South Brentwood, Channelview, Tex. 77530

[22] Filed: Oct. 24, 1974

[21] Appl. No.: 517,493

[52] U.S. Cl. ............................................ 82/33 A
[51] Int. Cl.² ..................... B23B 23/02; B23B 23/04
[58] Field of Search ....................... 82/33 R, 33 A, 45

[56] References Cited
UNITED STATES PATENTS

| 805,715 | 11/1905 | Dalley | 82/33 R |
| 1,428,620 | 9/1922 | Wilber | 82/45 X |
| 2,247,721 | 7/1941 | Wright | 82/33 A |
| 2,725,777 | 12/1955 | Benson | 82/33 R |
| 3,315,551 | 4/1967 | La Marca | 82/45 |
| 3,618,434 | 9/1971 | Navlt | 82/45 |

FOREIGN PATENTS OR APPLICATIONS

| 911,161 | 3/1946 | France | 82/33 R |

*Primary Examiner*—Harrison L. Hinson

[57] ABSTRACT

An adapter for rendering a live center for machines adjustable for adjustable centering of work pieces may comprise a generally conical body having a conical recess formed therein and adapted to receive the conical extremity of a rotatable live center element of a live center mechanism. A conical surface may be formed at one extremity of the conical body and may be disposed for receiving contact within the center hole of a work piece. The generally conical body may include pivot means internally thereof which may be disposed for contact with the conical extremity of a rotatable live center element. An adjustment mechanism may be provided for the conical body and may also engage the rotatable live center element, the adjustment mechanism being manipulated to impart controllable pivotal movement of the body relative to the rotatable live center element to achieve controlled shifting of the axis of the adapter relative to the axis of the rotatable live center element.

10 Claims, 6 Drawing Figures

U.S. Patent  Feb. 10, 1976  3,937,111
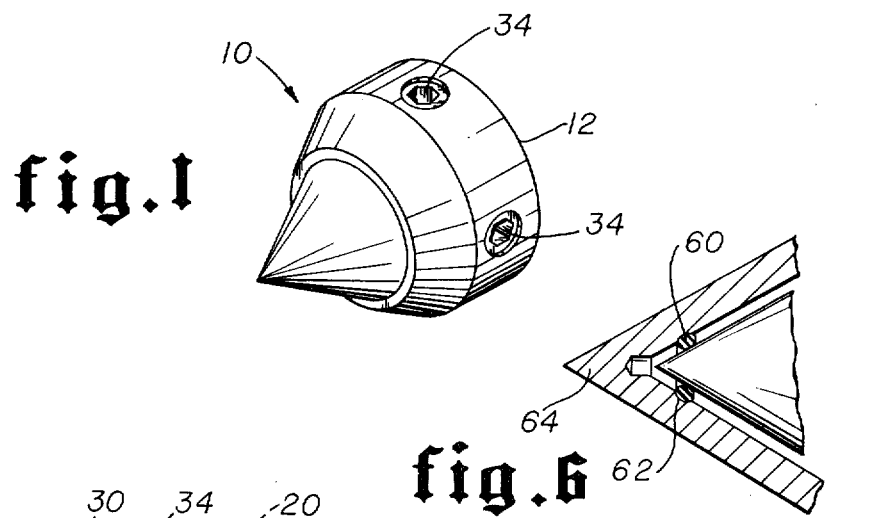
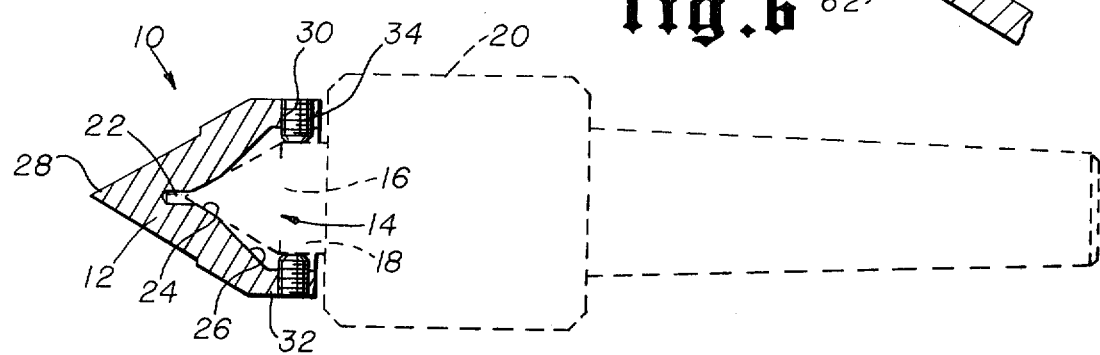
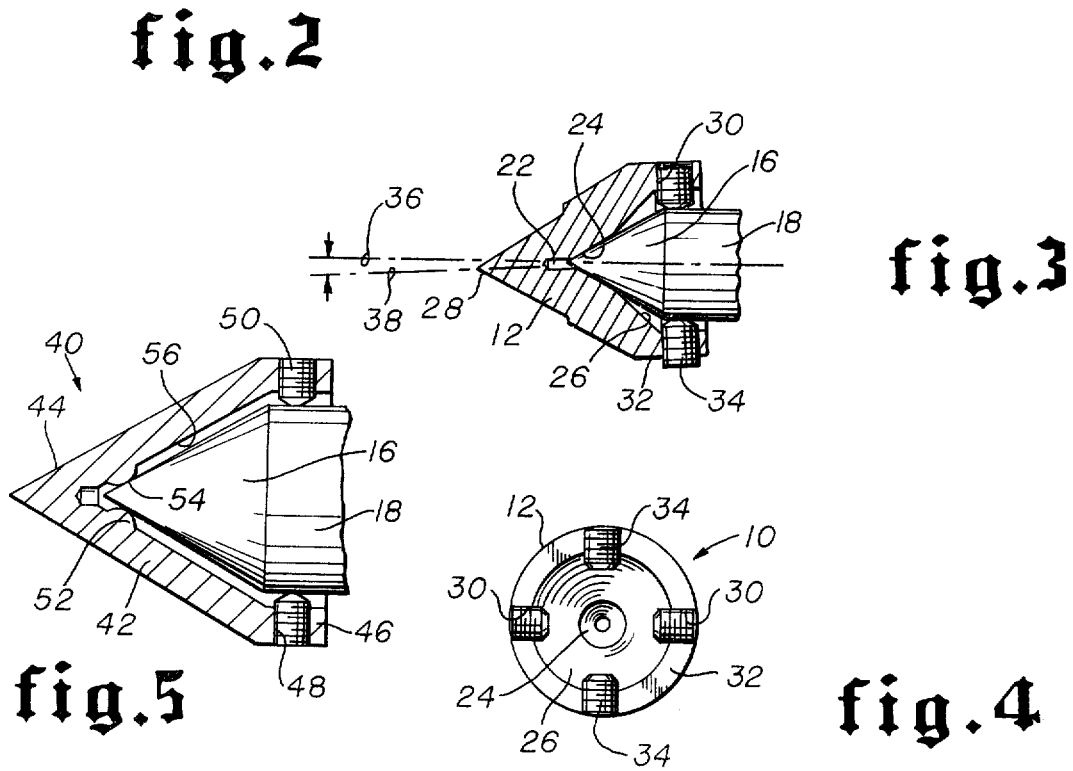

ADJUSTABLE LIVE CENTER ADAPTER

FIELD OF THE INVENTION

This invention relates generally to support center devices for lathes, grinders, milling machines, etc. and more particularly relates to an adjustment mechanism that has the capability of accomplishing controlled axial orientation of the work supporting portion thereof relative to the axis of a rotatable live center element in order that the axis of a work piece being supported may be adjusted as is necessary to align the peripheral portion of the work piece with the axis of the rotatable live center element.

BACKGROUND OF THE INVENTION

When involved in the process of turning the armatures of electric motors or in accomplishing many other work operations where work pieces are to be rotated about an axis thereof for the purpose of conducting a machining grinding or other work operation thereon, it is not unusual to determine that the axis of the work piece is not disposed precisely co-axial with the outer periphery of the rotatable work piece. One reason for this is that the axial shaft of a motor may have become bent during use or the manufacturing operation that produced the work piece may not have been accomplished in such manner that the periphery of the work piece is co-axial with the center of a shaft that supports the work piece. This is typically the case where a press fitting operation occurs during an assembly operation. Axial misalignment of the axis of a work supporting shaft with the outer periphery of a work piece supported by that shaft may render the work piece difficult or impossible to machine unless the axis of the work supporting shaft is shifted or adjusted relative to the axis of the machine conducting the machining operation.

One method of achieving axial shifting of a shaft may be accomplished by means of shimming wherein shims are utilized between the rotatable conical portion of a live center element and the center that has been formed in the axial shaft supporting the work piece. Shimming is a trial and error method and requires the work piece supporting elements to be disassembled from the work perhaps a number of times before proper sized shims are properly placed to achieve the degree of axial shifting that is desired. Shimming operations are very time consuming and therefore very expensive and typically have an adverse effect on the commercial feasibility of machining operations where axial shifting is necessary.

It is therefore a primary object of the present invention to provide a novel adapter mechanism that may be easily assembled to a conventional live center mechanism and which provides efficient and effective means for accurately and controllably shifting the axis of a work piece relative to the axis of the live center mechanism.

It is also an important object of the present invention to provide a novel adjustable adapter for live center mechanisms which may be assembled to such live center mechanisms in simple, efficient and quick manner to promote the commercial feasibility of axial shifting for machining operations.

Among the several objects of the present invention is noted the complication of a novel adapter for live center mechanisms wherein adjustment of the axis of a shaft supporting a work piece may be shifted angularly with respect to the axis of a live center mechanism supporting the work piece whereby the outer periphery of the work piece may be supported about an imaginary axis that is angularly related to the axis of a support shaft therefor.

Another object of the present invention concerns the provision of a novel adapter for live center mechanisms which may be assembled to most live center mechanisms without regard to the degree of taper or size of the adapter shank that is received by the machine conducting the machining operation.

It is an even further object of the present invention to provide a novel adjustable adapter for live center mechanisms that is extremely durable and will withstand the effects of commercial machining operations for long periods of time without adverse deterioration.

It is also a feature of the present invention to provide a novel adjustable adapter for live center mechanisms which is of simple nature, is reliable in use and low in cost.

Other and further objects, advantages and features of the present invention will become apparent to one skilled in the art upon consideration of this disclosure. The form of the invention which will now be described in detail illustrates the general principles of the invention but it is to be understood that this detailed description is not to be taken as limiting the scope of the present invention.

THE PRIOR ART

It has long been desirable to provide adjustable live center devices to achieve shifting of the axis of work pieces with respect to the axis about which the peripheral portion of the work piece may be rotated. In U.S. Pat. No. 3,057,238 to Benes an arbor is rotated through an arc to cause lateral shifting of an axis. Center adjustment devices have also been provided for dead centers as is taught by U.S. Pat. No. 2,944,455 to Hultenius et al, which provides cooperative inner and outer conical devices having bearing means interposed therebetween which transform the dead center into a live center mechanism. The mechanism of Hultenius et al, however, does not achieve axial adjustment of any nature. Axial shifting of tool centers is also taught in U.S. Pat. Nos. 2,247,721 Wright, 3,315,551 LaMarca and 3,756,102 Casey.

SUMMARY OF THE INVENTION

A generally conical body may be provided having a generally conical recess formed therein within which recess may be disposed the conical portion of a rotatable live center element that may form the rotatable portion of a conventional live center mechanism. The generally conical body may define a conical work support portion having an included angle of approximately sixty degrees which is adapted for engagement into the center hole formed at one extremity of a work piece for which machining is desired.

Within the generally conical body may be defined pivot means which may take the form of an annular support element that is disposed for engagement with the conical extremity of the rotatable live center element and either has limited surface contact or annular line contact with the conical surface of the live center element as the case may be. The contacting portion may be formed integrally with the generally conical body portion or may be simply received within the conical body as desired. A plurality of adjustment elements may be supported adjacent one extremity of the conical body portion and may engage the rotatable live center element of the live center mechanism to provide stabilized and adjustable support therebetween. The adjustment devices may conveniently take the form of a plurality of internally threaded apertures equally spaced about the periphery of the body portion and which receive externally threaded adjustment elements that may be manipulated individually to achieve the degree of axial shifting that is desired and which may be tightened for positive stabilized locking engagement between the body portion and the rotatable live center element.

BRIEF DESCRIPTION OF THE DRAWINGS

So that the manner in which the above-recited features, advantages and objects of the present invention as well as others which will become apparent are attained and can be understood in detail, more particular description of the invention briefly summarized above may be had by reference to the embodiments thereof which are illustrated in the appended drawings, which drawings form a part of this specification.

It is to be noted, however, that the appended drawings illustrate only certain typical embodiments of the numerous adjustable live center adapters that are made possible by employment of the invention set forth herein and it is therefore not to be considered limiting of its scope, for the invention may admit to other equally effective embodiments without departing from the spirit and scope of the present invention.

IN THE DRAWINGS

FIG. 1 is an isometric view of an adjustable live center adapter that is constructed in accordance with the scope of the present invention.

FIG. 2 is a sectional view of the live center adapter structure set forth in FIG. 1.

FIG. 3 is a sectional view of the nature set forth in FIG. 2, illustrating adjustment of the axis of the adapter relative to the axis of the rotatable live center element.

FIG. 4 is an end view of the adjustable live center adapter set forth in FIGS. 1-3.

FIG. 5 is a sectional view representing a modified embodiment of the present invention wherein line pivotal contact is established between the adapter element and the conical surface of a rotatable live center element.

FIG. 6 is a fragmentary sectional view illustrating a modified embodiment of the present invention wherein a separate pivot element is disposed within the adapter body for establishment of pivotal relation between the body and the conical extremity of a rotatable live center element.

DESCRIPTION OF PREFERRED EMBODIMENTS

Now referring to the drawings and first to FIGS. 1 and 2, there is depicted an adjustable live center adapter generally at 10 incorporating a body 12 of generally conical configuration having a generally conical recess shown generally at 14 that receives the conical extremity 16 of a rotatable live center element 18 of a live center mechanism 20, the live center mechanism with its live center element 18 being illustrated in broken line and not forming a part of the present invention.

The center or axis of the generally conical body 12 may be defined by a drilled blind bore 22 and the internal generally conical configuration of the body 12 may be largely defined by conical surfaces. Since the conical work engaging surface of a typical live center mechanism has an included angle of approximately sixty degrees, a frustoconical surface 24 having an included angle of approximately sixty degrees may be formed within the body 12, which surface may be disposed in engagement with the conical work engaging surface 16 of the rotatable portion of a live center mechanism. The frustoconical surface 24 may cooperate with the conical surface 16 to define a pivotal surface about which the body portion 12 may be moved to achieve proper positioning of the axis of the body 12 for proper support of the work piece. Manipulation of the body 12 to achieve movement thereof about the conical surface 16 of the rotatable live center element will be discussed in detail hereinbelow.

A second frustoconical surface 26 may be defined within the body portion 12 which frustoconical surface will have an included angle greater than 60° thereby providing relief between the frustoconical surface 26 and the conical surface 16 of the rotatable live center element. The relief that is provided by the relationship between the frustoconical surface 26 and the conical surface 16 of the live center element effectively achieves a pivotal relationship essentially at the point of the live center element between the live center element and the body 12. This pivotal relationship, due to axial spacing between the point of engagement between the body 12 and the conical surface 16 and the work engaging point area 28 of the adapter, allows controlled axial misalignment to occur between the axis of the adapter 10 and the axis of the rotatable portion of the live center adapter mechanism.

It will be desirable to provide for controlled adjustable rotation or pivoting of the body portion 12 about the conical surface 16 of the live center adapter to achieve optimum positioning of the point area of the live center adapter relative to the work piece and to achieve axial shifting between the adapter and the rotatable live center element. One means for accomplishing controlled adjustment may conveniently take the form illustrated in FIGS. 2, 3 and 4 where a plurality of internally threaded apertures 30 may be formed in a generally cylindrical portion 32 of the body structure 12, which apertures may be evenly spaced about said cylindrical portion. It will be convenient to provide for optimum shifting of the body portion 12 relative to the axis of the rotatable live center element to provide four apertures in the cylindrical portion of the adapter in order that positioning of the axis of the adapter relative to the axis of the live center element may be accomplished to an optimum degree. Utilization of four adjustment elements is not to be considered limiting of the spirit and scope of the present invention, it being obvious that differing numbers of adjustment elements may be effectively utilized without departing from the spirit or scope of the present invention. Within the internally threaded apertures 30 may be disposed a plurality of adjustment elements 34 which, according to the present invention may conveniently take the form of set screws having apertures formed therein for receiving conventional Allen wrenches for accomplishing adjustment. To accomplish angular adjustment of the axis of the body 12 relative to the axis of the live center element one of the set screws or adjustment devices 34 may be loosened while the other may be tightened thereby shifting the large extremity of the adapter element 10 relative to the work engaging point 28 and thereby causing the body 12 to pivot about the frustoconical work engaging surface 24 to achieved controlled misalignment between the axes of the adapter 10 and the live center element 18. When optimum positioning has been accomplished, the set screws 34 may be tightened, serving to positively secure or clamp the adapter 10 relative to the rotatable live center element 18.

The set screws 34 define a chuck mechanism, each of the set screws defining an adjustable jaw of the chuck mechanism and each being individually adjustable to insure accurately controlled positioning of the adapter structure 10 relative to the rotatable live center element 18.

Referring now to FIG. 3, the broken lines 36 and 38 represent the adjusted position of the axes between the rotatable live center element and the adapter 10. Broken line 36 represents the axis of the rotatable live center element 18 while broken line 38 represents the axis of the body 12. It is readily observed that the upper set screw is moved inwardly while the lower set screw is moved outwardly to achieve the degree of pivoting that is desired between the conical surface 16 and the frustoconical surface 24.

In the event the surface to be machined is misaligned or angularly disposed relative to the axis of the work piece, it is not necessary to employ shims or any other adjustment devices to achieve positioning of the work piece such that it rotates about an imaginary axis that places the working tool of the machine in substantial parallel relationship with the surface to be machined. For example, if the rotatable surface of an armature is slightly tapered with respect to the axis thereof, precision alignment between the tool that is employed to turn the armature may be accomplished by shifting of the axis of the armature relative to the axis defined by the rotatable live center element. A dial type micrometer gauge will be disposed in engagement with the outer peripheral surface of the armature or other such rotatable work piece and the work piece will be rotated by hand or very slowly thereby allowing the operator of the machine to visualize the degree and position of misalignment that exists. Simultaneously, the operator of the machine will be able to visualize the direction of the misalignment. By knowing from experience how many turns, quarter turns, half turns, etc. is required to achieve the desire of movement that is required to properly orient the axis of the body 12, the operator will simply loosen one or more of the set screws on one side of the body 12 and then will tighten or move inwardly one or more set screws on the opposite side of the body. After having done this the work may be again slowly rotated and minor misadjustment may be compensated for simply by again appropriately adjusting the set screws inwardly and outwardly as is desired for proper positioning of the body relative to the rotatable portion of the live center mechanism. Having accomplished proper alignment, the set screws may be tightened or tightening of the set screws may be accomplished as the final step of adjustment so as to insure positive locking between the rotatable portion 18 of the live center mechanism and the live center adapter 10. The live center adapter may be simply and efficiently attached to or removed from the live center mechanism simply through manipulation of the set screws 34.

With reference now to FIG. 5, there is depicted a modified embodiment of the live center adapter mechanism of the present invention illustrated generally at 40 may take the form of a body 42 having defined thereon a generally conical surface 44 that is adapted to be received within the center hole of a work piece. The body 42, like the body structure 12, also includes a generally cylindrical portion 46 having a plurality of internally threaded apertures 48 formed therein and adapted to receive set screws 50 or other adjustment elements that allow adjustable manipulation of the body 42 relative to a rotatable live center element 18 of a live center mechanism such as that shown in broken line in FIG. 2.

To achieve a pivotal relationship between the conical surface 16 of the rotatable live center element 18 the body portion 42 may be provided with an annular internal structure 52 defining a circular surface 54 of curved configuration which will be disposed for generally circular line contact with the conical surface 16 of the rotatable live center element 18. Line contact between the body structure 42 and the conical surface 16 will enable optimum controlling movement of the body structure 42 relative to the live center element 18 to be simply and efficiently accomplished. Moreover, the raised relationship between the internal annular portion 52 of the body structure 42 establishes a spaced relationship between the internal conical surface 56 and the conical surface 16 of the live center element, thereby allowing the adapter 40 to be easily pivoted to achieve the degree of axial misalignment that is desired for proper orientation of the work piece relative to the tool that accomplishes work on the work piece.

Although the pivot within the generally conical body is preferably established by means of a pivot surface that is machined within the body and may be of any suitable cross sectional configuration, it is not intended to limit the present invention to internally machined pivot surfaces. As is shown in FIG. 6, the pivot means may conveniently take the form of an annular ring 60 that may be received within an annular recess 62 that is formed by machining within the body 64. The annular pivot ring may be composed of any suitable metal or plastic material having sufficient structural integrity for withstanding the forces that are applied thereto during machining operations. It will be preferable to form the pivot ring 60 from a material that will not have a tendancy of yield during use because such yielding could cause the center that has been established to become changed as work is being accomplished.

In view of the foregoing it is quite clear that I have provided a novel adjustable live center adapter mechanism that may be simply and quickly received by conventional live center adapter mechanisms and which will effectively achieve controlled angular misalignment between the work piece engaging surface of the live center adapter and the work piece engaging surface of a typical live center mechanism. There is thereby provided an efficient and simple mechanism for optimum positioning of a work piece relative to a live center mechanism thereby enabling a machine operator to effectively eliminate the otherwise time consuming task of providing desired positioning between a live center and a work piece by the use of shims or other suitable conventional adjustment means. Through utilization of the present invention work pieces may be simply and efficiently adjusted relative to a tool that accomplishes machining thereof, and the time for machining set up operations will be reduced materially, thereby promoting the commercial feasibility of the machining operation.

It is therefore apparent that the present invention is one well adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in a limiting sense.

What is claimed is:

1. A center adjustment adapter for rendering a live center for machines adjustable for controlled positioning of work pieces relative to the work rotating axis of such machines, said adapter comprising:
   a body having a generally conical recess formed therein, said recess being adapted to receive the conical extremity of a rotatable live center element in non-rotatable relation therein;
   conical surface means being formed on the exterior of said body and being located for receiving contact within the center hole of a work piece to be rotatably supported by such machines;
   fixed pivot means being fixedly located within said body and being positioned for pivotal contact with the conical surface of said rotatable live center element near the pointed extremity thereof; and
   a plurality of adjustment screws being carried by said body and being located for engagement with said rotatable live center element at a position remote from said conical surface thereof, said adjustment screws, upon being controllably moved, imparting pivotal movement to said body relative to said rotatable live center element, said pivotal movement being about said fixed pivot means.

2. An adapter as recited in claim 1, wherein:
   said pivot means is of annular configuration and is of curved cross-sectional configuration and establishes line contact with said conical surface of said rotatable live center element.

3. An adapter as recited in claim 1, wherein said fixed pivot means comprises:
   an annular pivot portion being defined integrally within said body and having an annular portion of curved cross-sectional configuration defining generally annular pivot surface means, said pivot surface means being disposed for supporting contact relation with the conical extremity of said rotatable live center element.

4. An adapter as recited in claim 1, wherein:
   annular pivot receiver means is defined within said body; and
   said fixed pivot element is fixedly received within said pivot receiver means of said body with an outer portion thereof in engagement with said generally conical body and with an inner portion thereof disposed for non-rotatable positioning engagement with said conical surface of said rotatable live center element.

5. An adapter as recited in claim 1, wherein: said fixed pivot means is of generally circular configuration and defines a frustoconical contact surface, said frustoconical contact surface being disposed for non-rotatable contact with said conical surface of said rotatable live center element.

6. A center adjustment adapter for rendering a live center for machines adjustable for controlled positioning of work pieces relative to the work rotating axis of such machines, said adapter comprising:
   a body having a generally conical recess formed therein, said recess being adapted for receiving the conical extremity of a rotatable live center element in non-rotatable relation therein, said body having a generally cylindrical annular portion defining one extremity of said body;
   generally conical surface means being formed on the exterior of said body and being located for receiving contact within the center hole of a work piece to be rotatably supported by such machines;
   fixed pivot means being fixedly located within said body and being positioned for pivotal contact with the conical surface portion of a rotatable live center element near the pointed extremity thereof; and
   a chuck mechanism being located at one extremity of said body and having a plurality of individually adjustable jaws, said jaws being disposed for adjustable contacting relation with said rotatable live center element remote from said conical surface portion thereof and being individually manipulatable for controlling the fixed orientation of the axis of said body relative to the axis of said rotatable live center element.

7. An adapter as recited in claim 6, wherein said chuck mechanism comprises:
   a plurality of internally threaded adjustment apertures being formed within said body and being disposed in generally equally spaced relation one with the other; and
   a plurality of externally threaded adjustment elements being received by said adjustment apertures and having the inner extremities thereof disposed for engaging relation with said rotatable live center element at a position remote from said conical surface portion thereof.

8. An adapter as recited in claim 6, wherein said pivot means comprises:
   internal annular pivot means being formed integrally with said body and defining a curved cross-sectional configuration, said internal annular pivot means being disposed for pivotal contacting relation with said conical surface of said rotatable live center element at a position near the pointed extremity thereof.

9. An adapter as recited in claim 7, wherein said pivot means comprises:
   an annular internal portion of said body defining a generally annular pivot surface of curved cross sectional configuration, said pivot surface being disposed for establishment of annular line contact with said conical surface of said rotatable live center element.

10. An adapter as recited in claim 7, wherein said pivot means comprises:
    a pivot receiving portion being formed within said body; and
    an annular pivot element being fixedly located within said pivot receiving portion of said body and presenting fixed pivot surface means for establishment of pivotal contact relation with said conical surface of said rotatable live center element.

* * * * *